United States Patent [19]
Mohri et al.

[11] Patent Number: 5,851,649
[45] Date of Patent: Dec. 22, 1998

[54] INORGANIC POROUS SINTERED BODY AND FILTER

[75] Inventors: Masahide Mohri; Tetsu Umeda, both of Ibaraki, Japan

[73] Assignee: Sumitomo Chemical Company Limited, Osaka, Japan

[21] Appl. No.: 754,138

[22] Filed: Nov. 22, 1996

[30] Foreign Application Priority Data

Dec. 6, 1995 [JP] Japan .................................... 7-345289

[51] Int. Cl.$^6$ .................................................. C30B 29/20
[52] U.S. Cl. .................................... 428/319.1; 428/304.4; 428/312.2; 428/312.8; 428/318.4; 428/702; 428/212; 428/323; 210/510.1
[58] Field of Search ......................... 210/510.1; 428/323, 428/212, 702, 304.4, 312.2, 312.8, 318.4, 319.1

[56] References Cited

U.S. PATENT DOCUMENTS

| | | | |
|---|---|---|---|
| 4,587,016 | 5/1986 | Sumiyoshi | 210/500.2 |
| 5,045,111 | 9/1991 | Sane et al. | 75/407 |
| 5,190,897 | 3/1993 | Azumi | 210/506 |
| 5,523,074 | 6/1996 | Takahashi et al. | 423/625 |

FOREIGN PATENT DOCUMENTS

| | | |
|---|---|---|
| 0219383 | 4/1987 | European Pat. Off. . |
| 0644278 | 12/1993 | European Pat. Off. . |
| 1173689 | 2/1959 | France . |

*Primary Examiner*—A. A. Turner
*Attorney, Agent, or Firm*—Sughrue, Mion, Zinn Macpeak & Seas, PLLC

[57] ABSTRACT

An inorganic porous sintered body comprising inorganic particles of polyhedral crystals, said inorganic porous sintered body having pores formed by the inorganic particles, wherein said pores have a pore size distribution that a ratio of D10 to D90 is not more than 3 and D50 is 0.01–5 μm when D10, D50 and D90 are pore sizes at 10%, 50% and 90% cumulation from the largest pore size of a cumulative pore volume distribution, respectively, and a porosity is 10–50%.

12 Claims, 7 Drawing Sheets

INORGANIC POROUS SINTERED BODY AND FILTER

FIELD OF THE INVENTION

The present invention relates to an inorganic porous sintered body, a filter comprising the inorganic porous sintered body as a filtering layer or an intermediate layer, and a filter comprising an inorganic particles-packed body as a filtering layer or an intermediate layer.

BACKGROUND OF THE INVENTION

Porous ceramics have been utilized for various applications such as filtration, concentration, isolation and the like in the filed of foods, pharmaceutical preparations, electronics, biotechnologies and the like. The porous ceramics have also been utilized as a carrier of a catalyst for purifying a waste gas, a carrier for immobilizing a biological catalyst (e.g. enzyme, micro organism, etc.) used for a bioreactor and the like. In these applications, fine and uniform porosity is required in addition to intrinsic properties (e.g. heat resistance, chemical resistance, high strength, nontoxicity to living body, etc.) of the porous ceramics.

It has been known that porous ceramics having an uniform pore size distribution can be produced, for example, by a process using spherical ceramics particles or spherical granulated particles as an aggregate (Japanese Patent Kokai (Laid-Open) No. 62-191480), a process for making the surface of alumina aggregate particles round by calcining in a reducing atmosphere at a high temperature more than 1800° C. and the like(Japanese Patent Kokai (Laid-Open) No. 2-149482).

However, the porous ceramics produced by the process disclosed in Japanese Patent Kokai (Laid-Open) No. 62-191480 have a pore size of more than 10 $\mu$m. The porous ceramics produced by the process disclosed in Japanese Patent Kokai (Laid-Open) No.2-149482 are calcined at high temperature more than 1800° C. and, therefore, it is difficult to remain a fine pore structure. Accordingly, these processes were not suited to apply for filtration of an etching solution for electronics.

The present inventors have studied intensively about the porous ceramics which can be applied for filtration of the etching solution for electronics. As a result, it has been found that an inorganic porous sintered body having an uniform pore size distribution and a pore size controlled to 0.01∝5 $\mu$m can be applied for the above applications and is also superior in filtering characteristics. Thus, the present invention has been accomplished.

OBJECTS OF THE INVENTION

It is one object of the present invention is to provide an inorganic porous sintered body.

It is another object of the present invention is to provide a filter comprising the inorganic porous sintered body as a filtering layer or an intermediate layer, which is superior in filtering characteristics.

It is still another object of the present invention is to provide a filter comprising an inorganic particles-packed body as a filtering layer or an intermediate layer, which is superior in filtering characteristics.

These objects as well as other objects and advantages of the present invention will become apparent to those skilled in the art from the following description with reference to the accompanying drawings.

SUMMARY OF THE INVENTION

That is, the present invention provides an inorganic porous sintered body comprising inorganic particles of polyhedral crystals, said inorganic porous sintered body having pores formed by the inorganic particles, wherein said pores have a pore size distribution that a ratio of D10 to D90 is not more than 3 and D50 is 0.01–5 $\mu$m when D10, D50 and D90 are pore sizes at 10%, 50% and 90% cumulation from the largest pore size of a cumulative pore volume distribution, respectively, and a porosity is 10–50%.

DETAILED DESCRIPTION OF THE INVENTION

Hereinafter, the present invention will be explained in detail.

The inorganic porous sintered body of the present invention comprises inorganic particles which are polyhedral crystals. The inorganic porous sintered body has pores formed by the inorganic particles, and a ratio of D10 to D90 is not more than 3, preferably not more than 2, when D10, D50 and D90 are pore sizes at 10%, 50% and 90% cumulation from the largest pore size of a cumulative pore volume distribution, respectively. A pore size (D50) is from 0.01 to 5 $\mu$m, preferably from 0.01 to 3 $\mu$m, more preferably from 0.01 to 1 $\mu$m. A porosity of the inorganic porous sintered body is from 10 to 50%.

The process for producing the inorganic porous sintered body of the present invention will be explained.

The inorganic particles used as an aggregate are polyhedral crystals. The polyhedral crystal has preferably an uniform particle size and form. The inorganic particles are not specifically limited, but are preferably polyhedral crystals of α-alumina, titania, zirconia and the like in view of chemical resistance and heat resistance.

Examples of the process for producing the inorganic particles of polyhedral crystals having an uniform particle size and form (e.g. polyhedral crystals of α-alumina, titania, etc.) include processes disclosed in Japanese Patent Kokai (Laid-Open) Nos. 6-191833, 6-191836, 7-187613 and the like. That is, it is possible to produce polyhedral crystal particles of high-purity a-alumina or titania, which have uniform particle size and form and substantially have no fracture surface, by calcining a precursor of α-alumina or titania in an atmosphere containing a hydrogen halide, preferably hydrogen chloride. When agglomerated particles are contained in the inorganic particles of polyhedral crystals produced by these processes, they are preferably used after deagglomeration.

The inorganic particles obtained by said process are polyhedral particles whose average particle size can be optionally selected within the range from 0.1 to 30 $\mu$m in case of $\alpha$-alumina, and are polyhedral crystals characterized by a manner of appearing the crystal surface of the surface a {1120}, surface c {0001}, surface n {2243} and surface r {1012}. The purity of the particles is not less than 99.9% by weight and primary particles thereof have narrow and uniform particle size distribution. That is, primary particles have a particle size distribution that a ratio of D10 to D90 is preferably not more than 10, more preferably not more than 5, most preferably not more than 3, when D10 and D90 are particle sizes at 10% and 90% cumulation from the largest particle size of a cumulative particle size distribution, respectively.

In case of titania, the inorganic particles are polyhedral particles whose average particle size can be optionally selected within the range from 0.1 to 15 $\mu$m, and primary particles thereof have narrow and uniform particle size distribution similar to the case of $\alpha$-alumina. That is, primary particles have a particle size distribution that a ratio of D10 to D90 is preferably not more than 10, more preferably not more than 5, most preferably not more than 3, when D10 and D90 are particle sizes at 10% and 90% cumulation from the largest particle size of a cumulative particle size distribution, respectively.

The inorganic porous sintered body of the present invention can be produced by molding the resulting inorganic particles into a desired form, followed by calcining.

Specific examples of the process of molding the inorganic particles into the desired form include press molding, isostatic molding, extrusion molding, slip casting molding and the like. In this case, a molding aid can be used so as to increase the strength of the molded body. As the molding aid, organic materials removed by calcination, or inorganic materials compatibilized with the raw inorganic particles by calcination are preferred. Specific examples thereof include polyvinyl alcohol, polyvinyl butyral, methylcellulose, alumina sol, titania sol and the like, but are not limited thereto.

The calcining condition is not specifically limited because it varies depending on the kind of the inorganic particles. The calcining temperature is preferably from 1000° to 1800° C., more preferably from 1200° to 1600° C. When the calcining temperature is less than 1000° C., the strength of the porous sintered body may become weak, therefore, it is not suitable for practical use. On the other hand, when it exceeds 1800° C., the pore size distribution may become wide and the porosity may become small.

Thus, there can be produced the inorganic porous sintered body of the present invention wherein a ratio of D10 to D90 is not more than 3, preferably not more than 2, D50 is from 0.01 to 5 $\mu$m, preferably from 0.01 to 3 $\mu$m, more preferably from 0.01 to 1 $\mu$m, and a porosity is from 10 to 50%.

The diameter and porosity of pores of the inorganic porous sintered body can be appropriately adjusted by selecting the average particle size of the inorganic particles as the raw material according to applications.

For example, when using $\alpha$-alumina having the primary particle size within the range from 0.1 to 30 $\mu$m, the diameter of pores (D50) of the inorganic porous sintered body obtained from said $\alpha$-alumina becomes within the range from 0.01 to 5 $\mu$m and the porosity becomes about from 10 to 50%, corresponding to the average particle size of $\alpha$-alumina used.

An inorganic particles-packed body can be obtained by packing the inorganic particles of polyhedral crystals obtained by the above production process in a retention container. Since the inorganic particles produced by the above process have uniform form and particle size, they can be packed in the retention container, easily and densely. Therefore, a filter comprising the inorganic particles-packed body as the filtering layer can be produced.

As another embodiment of producing the inorganic particles-packed body, for example, the inorganic particles-packed body can also be produced by press molding (e.g. uniaxial molding, etc.), isostatic molding, extrusion molding or slip casting molding.

The inorganic particles constituting the inorganic particles-packed body thus obtained are polyhedral crystals, and the inorganic particles-packed body has pores formed by the inorganic particles which are polyhedral crystals. The ratio of D10 to D90 is not more than 3, preferably not more than 2, and D50 is from 0.01 to 5 $\mu$m, preferably from 0.01 to 3 $\mu$m, more preferably from 0.01 to 1 $\mu$m, when D10, D50 and D90 are pore sizes at 10%, 50% and 90% cumulation from the largest pore size of a cumulative pore volume distribution, respectively. The porosity is from 10 to 50%.

The above inorganic porous sintered body and inorganic particles-packed body are suitably used as a filter. These can be used alone as the filter, or can also be used in combination with the other base material or used by laminating on the other material, as a filtering layer in a multi-layer filter. Examples of the other base material used in combination include inorganic porous sintered body (e.g. alumina having a larger pore size) or porous sintered metal body, porous glass and the like. When using the inorganic porous sintered body and inorganic particles-packed body as a filter, a thickness of the inorganic porous sintered body and inorganic particles-packed body is preferably about from 1 to 100 $\mu$m.

The inorganic porous sintered body is preferably used as the multi-layer filter comprising the inorganic porous sintered body as the substantial filtering layer by laminating it on the other base material. In this case, it is preferred to use those which are superior in permeability of a fluid (e.g. water, etc.), for example, inorganic porous sintered body (e.g. alumina having a larger pore size) or porous sintered metal body, porous glass and the like. According to this process, it is possible to improve a permeability with maintaining excellent filtering characteristics of the inorganic porous sintered body, thereby improving a treating capacity of the filter.

The inorganic porous sintered body of the present invention are composed of an aggregate of inorganic polyhedral particles, and has narrow pore volume distribution that a ratio of D10 to D90 is not more than 3 when D10, D50 and D90 are pore sizes at 10%, 50% and 90% cumulation from the largest pore size of a cumulative pore volume distribution, respectively. Therefore, when using the inorganic porous sintered body as the filter, a rate of passing particles having a diameter larger than the desired particle size becomes small, and screening characteristics as the filter are excellent.

The inorganic porous sintered body of the present invention is composed of an aggregate of polyhedral particles which substantially have no fracture surface, and has few closed pores derived from non-uniform particles and sintering. Accordingly, when using the inorganic porous sintered body as the filter, a permeation resistance of a fluid is small and a water permeation rate is large. Therefore, permeating characteristics as the filter are excellent.

The filter comprising the inorganic particles-packed body of the present invention as the filtering layer also has a narrow pore volume distribution that a ratio of D10 to D90 is not more than 3 when D10 and D90 are pore sizes at 10% and 90% cumulation from the largest pore size of a cumulative pore volume distribution, respectively, similar to the inorganic porous sintered body of the present invention, and is superior in permeating characteristics as the filter.

The following Examples further illustrate the present invention in detail but are not to be construed to limit the scope thereof.

The measurement of physical properties in the Example was conducted according to the following procedures.

(1) Measurement of average primary particle size

A SEM (scanning electron microscope T-300, manufactured by JEOL Ltd.) photograph of polyhedral crystals was taken. Eighty to one hundred particles were selected from the photograph and image analysis was conducted to determine an average value of a corresponding circle diameter. The corresponding circle diameter means a value obtained by converting into a diameter of a perfect circle having the same area.

(2) Measurement of average pore size (D50) and pore size distribution (DI10/D90)

It was measured using a mercury porosimeter (Autoscan-60, manufactured by Yuasa Ionix Corp.) based on the principle of the mercury penetration process.

D10/D90 was determined as a measure of the pore size distribution and a value of D50 is an average pore size when D10, D50 and D90 are pore sizes at 10%, 50% and 90% cumulation from the largest pore size of a cumulative pore volume distribution, respectively.

(3) Measurement of water permeation rate

It was measured using a flow pore size distribution measuring device "Perm Porometer" manufactured by Porous Material Inc.

A water permeation rate was measured by sandwiching a plate-like sample between circular rubber ring having a diameter of 2 cm from both surfaces and making pressurized (0–3 atm) deionized water permeates into this circle.

(4) Measurement of porosity

After a dry weight of an inorganic porous sintered body or a packed body of inorganic particles was measured, air in pores was substituted with ethanol by deaerating in the state of being dipped in ethanol. After completion of the substitution, an in-liquid weight was measured in ethanol. Furthermore, the porous sintered body or packed body was pulled out from ethanol and a wet weight was measured in the state where pores are filled with ethanol. The porosity was calculated by the following equation:

Porosity (%)=100×(wet weight—dry weight)/(wet weight—in-liquid weight)

The powder of polyhedral α-alumina particles having an uniform particle size and form used in the following Examples was produced by the process described in Japanese Patent Kokai (Laid-Open) No. 6-191833 or 6-191836.

An aluminum oxide powder (manufactured by Sumitomo Chemical Industries Co., Ltd., AKP-G15, γ-alumina) was calcined in the reaction system that a hydrogen chloride gas was introduced. A mixed powder that an aluminum oxide powder (manufactured by Sumitomo Chemical Industries Co., Ltd., AKP-50, α-alumina) was added as a seed crystal was prepared and this mixed powder was calcined in the reaction system that the hydrogen chloride gas was introduced (concentration of hydrogen chloride gas: 100 volume fraction %). A retention temperature was from 900° to 1100° C. and a retention time was 60 minutes.

EXAMPLE 1

Figure 1:
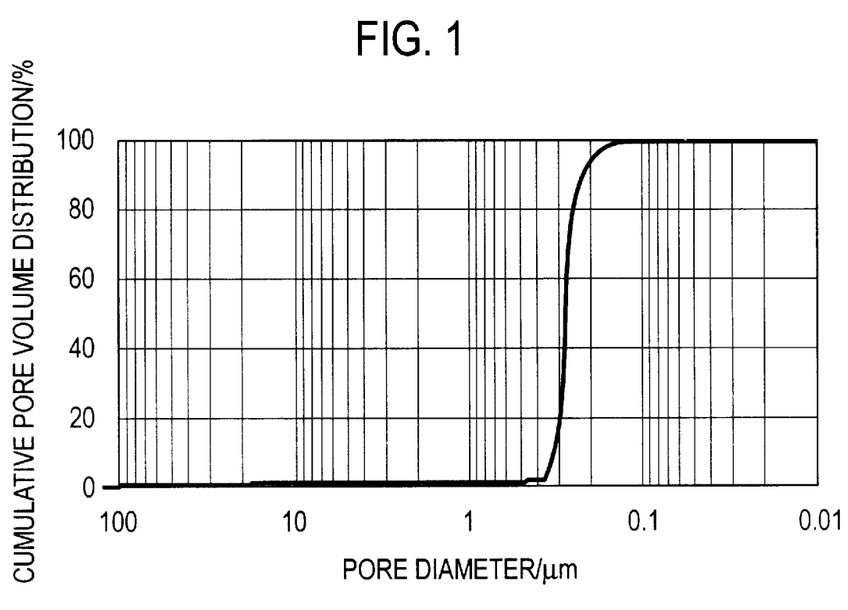
FIG. 1 is a graph illustrating a cumulative pore volume distribution curve of the porous sintered body obtained in Example 1.

A polyhedral α-alumina powder (average primary particle size: 0.5 μm, D90/D10: 2.5) was molded into a disk form having a diameter of 54 mm and a thickness of 2 mm by molding (molding pressure: 300 kg/cm$^2$) using an uniaxial press. This molded body was calcined in an air atmosphere. A calcining temperature was 1100° C. and a calcining time was 2 hours. A cumulative pore volume distribution curve of the resulting porous sintered body due to the mercury permeation process is shown in FIG. 1. The results of an average pore size, a ratio of D10 to D90 and a porosity are shown in Table 1.

EXAMPLE 2

A porous sintered body was made under the same conditions as those of Example 1 except for using a polyhedral α-alumina powder (average primary particle size: 2 μm, D90/D10: 2.0) and increasing the calcining temperature to 1500° C., and then the porous sintered body was evaluated. The results are shown in Table 1.

EXAMPLE 3

To a polyhedral α-alumina powder (average primary particle size: 2 μm, D90/D10: 2.0) was added an alumina sol (alumina manufactured by Condea Corp., Pural SB, specific surface area: 250 m$^2$/g as a molding aid, was dispersed in an aqueous 1 wt. % nitric acid solution to give an alumina sol) in an amount of 10% by weight (in terms of powder weight) per polyhedral α-alumina powder, and the mixture was dried to obtain a mixed powder. A porous sintered body was made under the same conditions as those of Example 1 except for increasing the calcining temperature to 1300° C., and then the porous sintered body was evaluated. The results are shown in Table 1.

EXAMPLE 4

Figure 2:
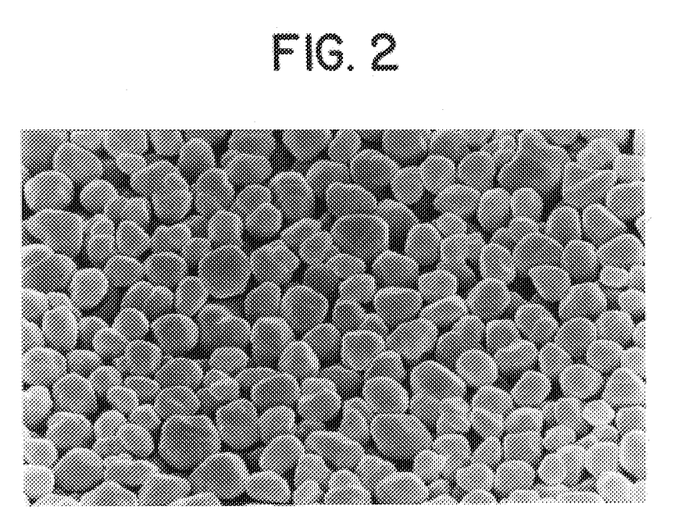
FIG. 2 illustrates a structure of the porous sintered body obtained in Example 4 (electron micrograph of 3,500 magnifications).

A porous sintered body was made under the same conditions as those of Example 1 except for using a polyhedral α-alumina powder (average primary particle size: 3 μm, D90/D10: 2.0) and increasing the calcining temperature to 1700° C., and then the porous sintered body was evaluated. The results are shown in Table 1. An electron micrograph (3,500 magnifications) illustrating a fine structure of the resulting porous sintered body is shown in FIG. 2. It was confirmed by FIG. 2 that polyhedral grains densely agglomerate to form homogeneous pores.

EXAMPLE 5

Figure 3:
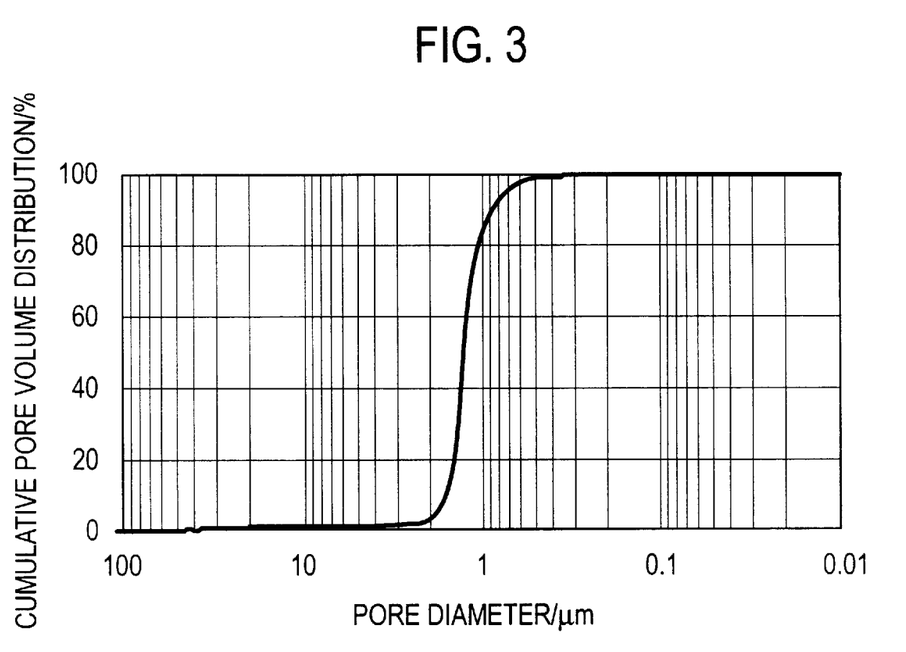
FIG. 3 is a graph illustrating a cumulative pore volume distribution curve of the porous sintered body obtained in Example 5.

A polyhedral α-alumina powder (average primary particle size: 5 μm, D90/D10: 1.8) (50 g) was weighed, and deionized water (200 g) and 1% by weight per polyhedral α-alumina powder, in term of powder weight, of a polyvinyl alcohol (manufactured by Kuraray Corp., Kuraray Poval PVA-205) as a molding aid were added to obtain a slurry. The slurry was dried to obtain a mixed powder. A molded body was made under the same conditions as those of Example 1, and then the molded body was calcined at 1700° C. to make a porous sintered body and the obtained porous sintered body was evaluated. A cumulative pore volume distribution curve of the resulting porous sintered body due to the mercury penetration process is shown in FIG. 3.

EXAMPLE 6

A molded body was made using a polyhedral α-alumina powder (average primary particle size: 10 μm, D90/D10:

2.2) under the same conditions as those of Example 5, and then the molded body was calcined at 1500° C. to make a porous sintered body and the obtained porous sintered body was evaluated. The results are shown in Table 1.

EXAMPLE 7

Figure 4:
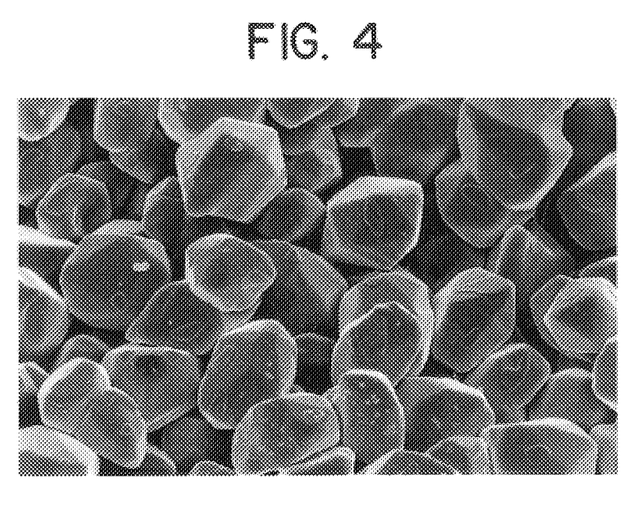
FIG. 4 illustrates a structure of the porous sintered body obtained in Example 7 (electron micrograph of 1,000 magnifications).

A molded body was made using a polyhedral α-alumina powder (average primary particle size: 18 μm, D90/D10: 2.5) under the same conditions as those of Example 5, and then the molded body was calcined at 1600° C. to make a porous sintered body and the obtained porous sintered body was evaluated. The results are shown in Table 1. An electron micrograph (1,000 magnifications) illustrating a fine structure of the resulting porous sintered body is shown in FIG. 4.

Comparative Example 1

Figure 5:
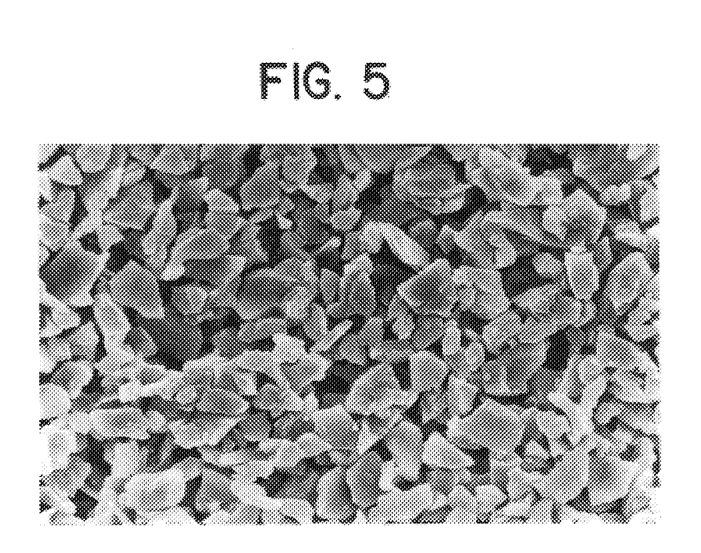
FIG. 5 illustrates a structure of the porous sintered body obtained in Comparative Example 1 (electron micrograph of 3,500 magnifications).

To an α-alumina powder (manufactured by Fujimi Kenmazai Kogyo Co., Ltd., WA#6000, average primary particle size: 2 μm, alumina powder of free-form particles which are not polyhedral crystals) made by the electromelting process was added an alumina sol (alumina manufactured by Condea Corp., Pural SB, specific surface area: 250 m$^2$/g, as a molding aid, was dispersed in an aqueous 1 wt. % nitric acid solution to give an alumina sol) in an amount of 10% by weight (in terms of powder weight) per electromolten α-alumina powder, and then the mixture was dried to obtain a mixed powder. A porous sintered body was made using this mixed powder under the same conditions as those of Example 3, and then the porous sintered body was evaluated. The results are shown in Table 1. An electron micrograph (3,500 magnifications) illustrating a fine structure of the resulting porous sintered body is shown in FIG. 5.

Comparative Example 2

An α-alumina powder (manufactured by Fujimi Kenmazai Kogyo Co., Ltd., WA#2000, average primary particle size: 8 μm, alumina powder of free-form particles which are not polyhedral crystals) made by the electromelting process was molded into a disk form having a diameter of 54 mm and a thickness of 2 mm by molding (molding pressure: 300 kg/cm$^2$) using an uniaxial press. This molded body was calcined in an air atmosphere. A calcining temperature was 1700° C. and a calcining time was 2 hours. The resulting porous sintered body was evaluated. The results are shown in Table 1.

Comparative Example 3

Figure 6:
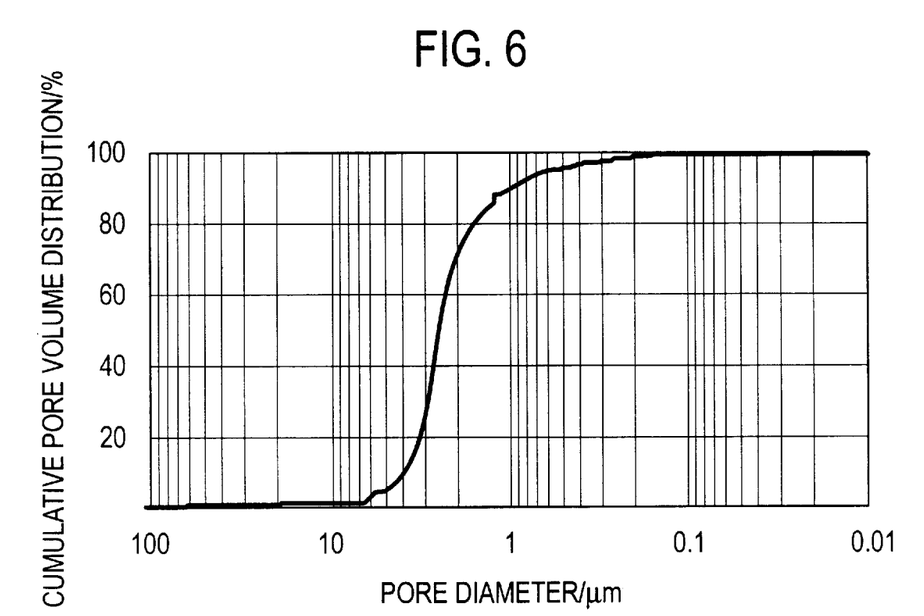
FIG. 6 is a graph illustrating a cumulative pore volume distribution curve of the porous sintered body obtained in Comparative Example 3.

A porous sintered body was made using an α-alumina powder (manufactured by Fujimi Kenmazai Kogyo Co., Ltd., WA#2000, average primary particle size: 8 μm, alumina powder of free-form particles which are not polyhedral crystals) made by the electromelting process under the same conditions as those of Comparative Example 1, and then the porous sintered body was evaluated. A cumulative pore volume distribution curve of the resulting porous sintered body due to the mercury penetration process is shown in FIG. 6.

Comparative Example 4

A porous sintered body was made using an α-alumina powder (manufactured by Fujimi Kenmazai Kogyo Co., Ltd., WA#800, average primary particle size: 20 μm, alumina powder of free-form particles which are not polyhedral crystals) made by the electromelting process under the same conditions as those of Comparative Example 2, and then the porous sintered body was evaluated. The results are shown in Table 1.

Comparative Example 5

A porous sintered body was made using an α-alumina powder (manufactured by Fujimi Kenmazai Kogyo Co., Ltd., WA#800, average primary particle size: 20 μm, alumina powder of free-form particles which are not polyhedral crystals) made by the electromelting process under the same conditions as those of Comparative Example 1, and then the porous sintered body was evaluated. The results are shown in Table 1.

Comparative Example 6

A molded body was made using an α-alumina powder (manufactured by Sumitomo Chemical Industries Co., Ltd., AKP-20, average primary particle size: 0.5 μm, alumina powder of free-form particles which are not polyhedral crystals) made by the hydrolysis process under the same conditions as those of Example 1, and then the molded body was calcined at 1100° C. The resulting porous sintered body was evaluated. The results are shown in Table 1.

EXAMPLE 8

A polyhedral α-alumina powder (average primary particle size: 2 μm, D90/D10: 2.0) (50 g) was weighed, and deionized water (30 g), a dispersing agent (SN-5468, San Nopco Co., Ltd.) (0.5% by weight based on the powder weight) and polyvinyl alcohol (manufactured by Kuraray Corp., Kuraray Poval PVA-205) (1% by weight based on the powder weight) as a molding aid were added to obtain a slurry.

Four kinds of molded bodies were made using this slurry by the slip casting process, and then the molded bodies were calcined at 1400° C. to obtain inorganic porous sintered bodies having a diameter of 30 to 60 mm and a thickness of 1 to 3 mm. An average pore size of these inorganic porous sintered bodies is from 0.5 to 0.6 μm and D10/D90 was 1.4 to 1.5.

Furthermore a base material was made using a polyhedral α-alumina powder (average primary particle size: 18 μm, D90/D10: 2.5) according to the same manner as that described above, and then the base material was calcined at 1700° C. The resulting base material was dipped in a slurry containing the above polyhedral α-alumina powder (average primary particle size: 2 μm), pulled out from the slurry, and then dried, and then calcined at 1400° C. to obtain a two-layer filter having a filtering layer (thickness: about 100 μm) as a porous sintered body of a polyhedral α-alumina powder having an average particle size of 2 μm on the base material.

Figure 7:
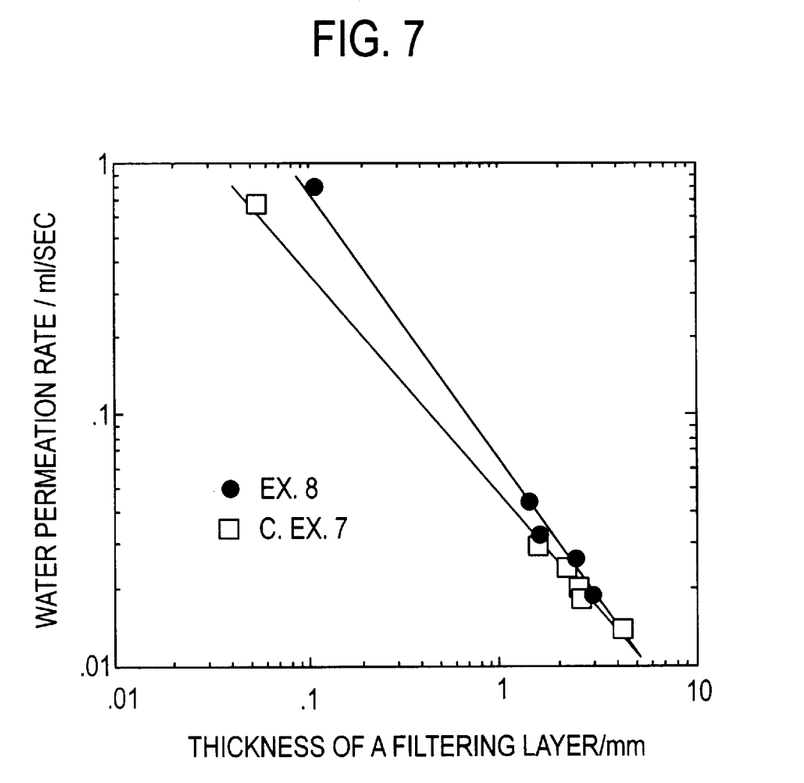
FIG. 7 is a graph illustrating a relation between a thickness of a filtering layer of various porous sintered body filters and water permeation rate at a differential pressure (1 atm) obtained in Example 8 and Comparative Example 7.

A water permeation rate of these porous sintered bodies was measured using deionized water. The measuring results were arranged to give a relation between a thickness of a filtering layer and a water permeation rate. The relation is shown in FIG. 7. As is apparent from FIG. 7, the water permeation rate of this porous sintered body was superior to that of the porous sintered body of Comparative Example 7.

Comparative Example 7

An inorganic porous sintered body having a diameter of 30 to 60 mm and a thickness of 1 to 3 mm was obtained using an α-alumina powder (manufactured by Fujimi Kenmazai Kogyo Co., Ltd., WA#6000, average primary particle size: 2 μm, alumina powder of free-form particles which are not polyhedral crystals) according to the same manner as that described in Example 8. An average pore size of these inorganic porous sintered bodies is from 0.6 to 0.7 μm and D10/D90 was 2.0 to 2.7.

Furthermore a base material was made using a polyhedral α-alumina powder (average primary particle size: 18 μm, D90/D10: 2.5) according to the same manner as that described above, and then the base material was calcined at 1700° C. The resulting base material was dipped in a slurry containing an α-alumina powder (average primary particle size: 2 μm) made by the above electromelting process, pulled out from the slurry, and then dried, and then calcined at 1400° C. to obtain a two-layer filter having a filtering layer (thickness: about 50 μm) as a porous sintered body of an electromolten α-alumina powder having an average particle size of 2 μm on the base material.

A water permeation rate of these porous sintered bodies was measured using deionized water. The measuring results were arranged to give a relation between a thickness of a filtering layer and a water permeation rate. The relation is shown in FIG. 7.

EXAMPLE 9

A polyhedral α-alumina powder (average primary particle size: 2 μm, D90/D10: 2.0) was charged in a cylindrical metal container (inner diameter: 2 cm, the bottom part is a sintered metal plate having an average pore size of 10 μm) and packed by tapping. Then, the powder was pressurized at 300 kg/cm² using an uniaxial press. The water permeation rate was measured using a packed body wherein a thickness of the resulting powder layer is 3 mm according to the same manner as that described in Example 8. The water permeation rate was 0.35 ml/sec. Filtering characteristics were good.

What is claimed is:

1. An alumina porous sintered body comprising alumina polyhedral particles having a primary particle size of from 0.1 to 3 μm, said alumina porous sintered body having pores formed by the alumina particles, wherein said pores have a pore size distribution such that a ratio of D10 to D90 is not more than 2 and D50 is 0.01–1 μm, wherein D10, D50 and D90 represent pore sizes at 10%, 50% and 90% cumulation from the largest pore size of a cumulative pore volume distribution, respectively, and the porous sintered body has a porosity of 10–50%.

2. A filter comprising the alumina porous sintered body according to claim 1 as a filtering layer or an intermediate layer.

3. The alumina porous sintered body according to claim 1, wherein the alumina porous sintered body is obtainable by a process comprising the steps of molding the alumina particles and calcining the molded alumina particles.

4. The alumina porous sintered body according to claim 3, wherein the molding process is selected from the group consisting of press molding, isotactic molding, extrusion molding and slip casting molding.

5. The alumina porous sintered body according to claim 1, wherein the alumina porous sintered body is calcined at a temperature of from 1000° C. to 1800° C.

6. The alumina porous sintered body according to claim 1, wherein the alumina porous sintered body is calcined at a temperature of from 1200° C. to 1600° C.

7. A filter comprising a packed body of alumina polyhedral particles having a primary particle size of 0.1 to 3 μm as a filtering layer or an intermediate layer, said packed body having pores formed by the alumina particles, wherein said pores have a pore size distribution such that a ratio of D10 to D90 is not more than 2 and D50 is 0.01–1 μm, wherein D10, D50 and D90 represent pore sizes at 10%, 50% and

TABLE 1

| | raw material powder | primary particle size (μm) | molding aid | D50 (μm) | D10 (μm) | D90 (μm) | D10/D90 | porosity (%) | water permeation rate (ml/sec) |
|---|---|---|---|---|---|---|---|---|---|
| Ex. 1 | polyhedral α-alumina | 0.5 | no | 0.26 | 0.30 | 0.22 | 1.37 | 42.9 | — |
| Ex. 2 | polyhedral α-alumina | 2 | no | 0.56 | 0.67 | 0.45 | 1.49 | 28.4 | 0.23 |
| Ex. 3 | polyhedral α-alumina | 2 | alumina sol | 0.62 | 0.75 | 0.41 | 1.84 | 37.8 | — |
| Ex. 4 | polyhedral α-alumina | 3 | no | 0.85 | 1.11 | 0.68 | 1.63 | 21.3 | — |
| Ex. 5 | polyhedral α-alumina | 5 | PVA | 1.21 | 1.57 | 0.86 | 1.83 | 25.5 | 0.5 |
| Ex. 6 | polyhedral α-alumina | 10 | PVA | 2.75 | 4.33 | 2.17 | 2.00 | 39.1 | — |
| Ex. 7 | polyhedral α-alumina | 18 | PVA | 4.10 | 5.60 | 2.45 | 2.28 | 38.9 | 1.3 |
| C. Ex. 1 | electromolten α-alumina | 2 | alumina sol | 0.75 | 1.21 | 0.45 | 2.70 | 45.2 | 0.20 |
| C. Ex. 2 | electromolten α-alumina | 8 | no | 1.89 | 2.96 | 1.27 | 2.34 | — | 0.3 |
| C. Ex. 3 | electromolten α-alumina | 8 | alumina sol | 2.30 | 3.93 | 1.00 | 3.91 | 43.3 | — |
| C. Ex. 4 | electromolten α-alumina | 20 | no | 6.78 | 9.03 | 3.50 | 2.58 | — | 0.9 |
| C. Ex. 5 | electromolten α-alumina | 20 | alumina sol | 3.54 | 4.56 | 1.49 | 3.06 | 41.6 | — |
| C. Ex. 6 | hydrolysis α-alumina | 0.5 | no | 0.20 | 0.38 | 0.15 | 2.53 | — | — |

90% cumulation from the largest pore size of a cumulative pore volume distribution, respectively, and the packed body has a porosity of 10–50%.

8. The filter according to claim 7, wherein the filter is obtainable by molding the alumina particles of polyhedral crystals or packing the alumina particles of polyhedral crystals in a retention container.

9. The filter according to claim 8, wherein the molding process is selected from the group consisting of press molding, isotactic molding, extrusion molding and slip casting molding.

10. The alumina porous sintered body or filter according to claim 1 or 7, wherein the alumina polyhedral particles have a primary particle size of 0.5 to 3 μm.

11. The alumina porous sintered body or filter according to claim 1 or 7, wherein the alumina polyhedral particles have a particle size distribution such that a ratio of D10 to D90 is not more than 3, wherein D10 and D90 represent particle sizes at 10% and 90% cumulation from the largest particle size of a cumulative particle size distribution.

12. The alumina porous sintered body or filter according to claim 1 or 7, wherein the alumina polyhedral particles have a primary particle size of 0.5 to 3 μm and have a particle size distribution such that a ratio of D10 to D90 is not more than 3, wherein D10 and D90 represent particle sizes at 10% and 90% cumulation from the largest particle size of a cumulative particle size distribution.

* * * * *